(12) United States Patent
Huillet et al.

(10) Patent No.: US 9,267,403 B2
(45) Date of Patent: Feb. 23, 2016

(54) DEVICE FOR MONITORING THE SEALING OF A ROTORCRAFT TRANSMISSION BOX BY SUCTION

(71) Applicant: AIRBUS HELICOPTERS, Marignane (FR)

(72) Inventors: Daniel Huillet, Marignane (FR); Vincent Quintric, Rognac (FR)

(73) Assignee: Airbus Helicopters, Marignane (FR)

(*) Notice: Subject to any disclaimer, the term of this patent is extended or adjusted under 35 U.S.C. 154(b) by 548 days.

(21) Appl. No.: 13/874,812

(22) Filed: May 1, 2013

(65) Prior Publication Data

US 2013/0294884 A1    Nov. 7, 2013

(30) Foreign Application Priority Data

May 7, 2012    (FR) ...................................... 12 01311

(51) Int. Cl.

| | | |
|---|---|---|
| G01M 3/02 | (2006.01) |
| F01M 11/12 | (2006.01) |
| F01M 1/10 | (2006.01) |
| F01M 1/18 | (2006.01) |
| F01M 11/10 | (2006.01) |
| B64C 27/12 | (2006.01) |
| B64D 45/00 | (2006.01) |
| F16H 57/029 | (2012.01) |

(52) U.S. Cl.
CPC ................ *F01M 11/12* (2013.01); *B64C 27/12* (2013.01); *F01M 1/10* (2013.01); *F01M 1/18* (2013.01); *F01M 11/10* (2013.01); *B64D 2045/0085* (2013.01); *F16H 57/029* (2013.01); *G01M 3/02* (2013.01)

(58) Field of Classification Search
CPC ......... G01M 3/32; G01M 3/025; G01M 3/26; G01M 3/3263; G01M 3/02; F01D 21/003; F01D 25/18
See application file for complete search history.

(56) References Cited

U.S. PATENT DOCUMENTS

| | | | | |
|---|---|---|---|---|
| 3,722,321 | A | * | 3/1973 | Walker et al. ................ 74/606 R |
| 3,793,876 | A | * | 2/1974 | Oswald .............................. 73/46 |
| 4,338,812 | A | * | 7/1982 | Lindgren ................... 73/40.5 R |
| 4,987,796 | A | * | 1/1991 | von Kaler et al. .......... 74/606 R |
| 5,339,676 | A | * | 8/1994 | Johnson ............................ 73/40 |

(Continued)

FOREIGN PATENT DOCUMENTS

| | | |
|---|---|---|
| DE | 102007026338 A1 | 12/2008 |
| FR | 2774655 A1 | 8/1999 |

(Continued)

OTHER PUBLICATIONS

Search Report and Written Opinion; Application No. FR 1201311; dated Feb. 20, 2013.

*Primary Examiner* — David A Rogers
(74) *Attorney, Agent, or Firm* — Brooks Kushman P.C.

(57) ABSTRACT

A device for monitoring the sealing state of a casing (2) of a transmission box (1) of a rotorcraft. An open airflow circuit (7) fitted with a suction generator member (10) is connected to a vent (5) of the casing (2). Regulator means (12) maintain stable suction in the airflow circuit (7) relative to a setpoint threshold (S), the regulator means being controlled in response to a pressure gauge (13) for measuring the suction generated inside the airflow circuit (7). The device is used on the ground to detect a source of leakage in the casing (2) and in flight to retain lubricant inside the casing (2) in the event of there being a source of leakage.

18 Claims, 1 Drawing Sheet

(56) References Cited

U.S. PATENT DOCUMENTS

| | | | |
|---|---|---|---|
| 5,372,031 A * | 12/1994 | Harmand | 73/40 |
| 5,537,857 A * | 7/1996 | Grosse Bley | 73/40.7 |
| 5,939,620 A * | 8/1999 | Strand | 73/49.2 |
| 6,470,666 B1 | 10/2002 | Przytulski et al. | |
| 6,823,719 B2 * | 11/2004 | Poblete | 73/46 |
| 7,347,087 B2 * | 3/2008 | Rankin et al. | 73/118.01 |
| 8,402,818 B2 * | 3/2013 | Bernard et al. | 73/49.7 |
| 2002/0112528 A1 * | 8/2002 | Antonioli et al. | 73/49.7 |
| 2002/0195296 A1 * | 12/2002 | Maret et al. | 184/6.22 |
| 2008/0036617 A1 | 2/2008 | Arms et al. | |
| 2008/0216560 A1 * | 9/2008 | Ridgway et al. | 73/40.5 R |
| 2009/0100910 A1 * | 4/2009 | Brown | 73/49.2 |
| 2009/0164056 A1 * | 6/2009 | Cornet et al. | 701/3 |
| 2010/0025159 A1 * | 2/2010 | Gmirya et al. | 184/6.4 |
| 2010/0101335 A1 | 4/2010 | Volanthen et al. | |
| 2010/0216398 A1 | 8/2010 | Finn et al. | |
| 2012/0130617 A1 * | 5/2012 | Raimarckers et al. | 701/99 |

FOREIGN PATENT DOCUMENTS

| | | | | |
|---|---|---|---|---|
| GB | 2266964 A | | 11/1993 | |
| JP | 63070140 A | * | 3/1988 | G01M 3/28 |
| JP | 2010058792 A | | 3/2010 | |
| WO | 2008091341 A2 | | 7/2008 | |

* cited by examiner

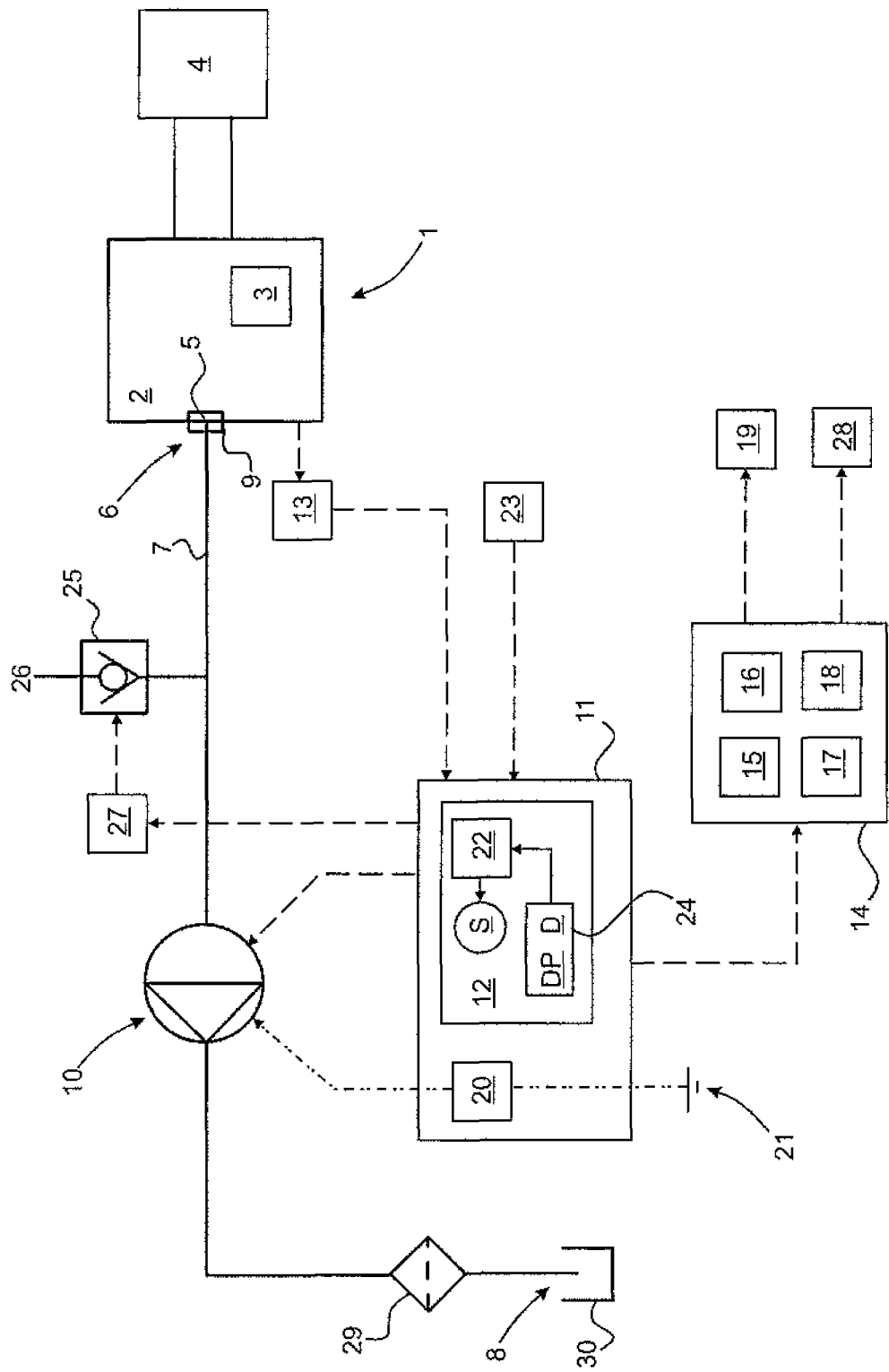

DEVICE FOR MONITORING THE SEALING OF A ROTORCRAFT TRANSMISSION BOX BY SUCTION

CROSS REFERENCE TO RELATED APPLICATIONS

The present application claims priority to French patent application No. FR 12/01311 filed on May 7, 2012, the content of which is incorporated in its entirety by reference herein.

BACKGROUND OF THE INVENTION (1) Field of the Invention

The present invention relates to the field of transmission boxes fitted to rotorcraft, serving to transmit motion between at least one driver source and at least one receiver source, such as a member of the rotorcraft that is to be driven. The present invention relates more particularly to arrangements concerning the lubrication of moving members housed in a casing forming part of such transmission boxes.

The present invention relates more specifically to ways of monitoring the operation of such a transmission box relative to any loss of lubricant, usually oil, contained in a casing of the transmission box. Such a loss of lubricant may stem, for example, from a structural sealing failure in the casing and/or from a failure of sealing members of the casing.

(2) Description of Related Art

Rotorcraft are fitted with various transmission boxes for transmitting motion between at least one driver source and at least one receiver source. For example, a rotorcraft power plant for driving at least one rotor is fitted with at least one main gearbox for transmitting power from a driver member of the power plant to the rotor(s). Also by way of example, secondary gearboxes may be engaged with the main gearbox for driving various pieces of equipment and/or accessories of the rotorcraft.

Gearboxes comprise a casing in which various transmission members are installed that are arranged in mutual engagement and that are carried by transmission shafts. The transmission shafts comprise in particular drive shafts and intermediate shafts.

By way of example, drive shafts comprise at least one inlet shaft driven from a driver source and at least one outlet shaft for driving equipment that needs to be moved. One or more intermediate shafts may be interposed between an inlet shaft and an outlet shaft. The transmission shafts engage with one another via transmission members that they carry, and they are installed in the casing via bearing members.

By analogy with gearboxes, bearing boxes are also known for mounting moving members, rotary shafts in particular, that are mounted on bearings in a casing via rolling members, with movement being transmitted from an inlet of at least one shaft to an outlet of at least one shaft, said inlet and said outlet can be arranged on the same shaft or on respective shafts.

The moving members of transmission boxes, such as in particular transmission members, transmission shafts, and/or rolling members, are subjected to heating caused by the friction they suffer. In order to preserve the moving members from such heating, transmission boxes are commonly fitted with a lubrication circuit. A supply of lubricant, in particular of oil, is provided inside the casing. The lubricant flows via a lubrication circuit between the casing and a heat exchanger serving to cool the lubricant.

A general problem that arises lies in the sealing of the casing, which might be faulty. Leaks of lubricant can be observed and it is necessary for the sealing of the casing to be checked regularly.

For example, the casing often comprises a plurality of casing elements that are assembled together. Such assembly constitutes a potential source of leakage through the junction zones where elements of the casing join one another.

Also by way of example, rolling members interposed between the casing and the drive shafts are potential sources of leaks of lubricant. In order to avoid such leaks, the casing and/or the rolling members are commonly provided with sealing members. Nevertheless, wear and/or failure of the sealing members can allow lubricant to escape from the casing.

Also by way of example, casings are commonly provided with at least one vent for allowing air contained inside the casing to escape naturally. Such a natural escape of air is necessary because the air contained in the casing expands under the effect of the temperature rise caused by the moving members heating up. In this respect, reference may be made for example to document DE 10 2007 026338 (MAGNA POWERT AG & CO KG), that proposes preventing oil from escaping through the vent by making use of a deformable membrane that closes the vent by deforming under the effect of the air expanding.

Prior to transmission boxes being put into service, it is common practice to perform operations to verify their sealing. In one conventional method, the transmission box is coated in a substance suitable for revealing zones that are potential sources of lubricant escaping from the casing. The leakage sources that are revealed are subsequently treated individually in order to remedy the observed losses of sealing of the transmission box. The sealing of the transmission box is then verified once more in order to check that the treatment of the sources of leakage is effective. A possible additional verification operation is commonly performed under conditions in which the moving members of the transmission box are put into movement. For this purpose, the casing is filled with a liquid and the moving members are driven for a predetermined duration in order to verify whether any liquid escapes from the casing.

Such techniques for verifying the sealing of transmission boxes are lengthy and expensive, but they are effective and necessary given the safety constraints that apply to aircraft. As a result, it is desirable to avoid as far as possible any occasion on which it is observed that the transmission box is not thoroughly sealed.

BRIEF SUMMARY OF THE INVENTION

In terms of making rotorcraft safe, and in general, maintenance operations are frequent and they give rise to costs that it is appropriate to reduce. Such maintenance operations comprise verifying the essential members of the rotorcraft, including in particular the sealing of its transmission boxes.

A first object of the present invention is to reduce such constraints on verifying the sealing of transmission boxes on board rotorcraft. It is desired more particularly to observe reliably that the transmission box is indeed sealed prior to being mounted on a rotorcraft and being put into service, while avoiding performing a lengthy and expensive method into making that observation.

A second object of the present invention is to reduce the costs of maintenance operations on a rotorcraft by making operations of monitoring the sealing of transmission boxes easier and by limiting any repairs of observed leaks to repairs of leaks that are deemed to be significant, in particular in terms of rotorcraft safety.

Still in terms of rotorcraft safety, it is appropriate to provide solutions that make it possible to mitigate the consequences of small-amplitude failures, if any, in a member of the rotorcraft, and prior to that member being repaired. It is desirable for the solutions that are implemented to be sufficient without being excessive, until the rotorcraft is verified in the context of a maintenance and inspection operation.

A third object of the present invention is to propose such a mitigating solution that maintains sufficient sealing for a transmission box of a rotorcraft while waiting for a long-term repair of a sealing failure of the transmission box during a planned maintenance operation on the rotorcraft.

In order to assess the technological environment of the present invention with respect to this third object, it is possible to refer to a technique that is known in the field of aircraft and that consists in lowering the pressure of a casing housing moving members in order to avoid loss of lubricant caused by a failure in the sealing of the casing. By way of example, the casing may be a gearbox casing as disclosed in WO 2008/091341 (Sirkosky Aircraft Corp. et al.), or indeed a casing for mounting a drive shaft driven by a turbine, as disclosed in U.S. Pat. No. 6,470,666 (General Electric Corp. et al.).

Reference may also be made to a technological environment that is more remote from the present invention. For example, document JP 2010 058792 (Tatsuno Corp.) describes a device for detecting a leak from a buried tank. Also by way of example, document GB 2 266 964 (Snecma) describes a circuit for lubricating members housed in a casing. The lubrication circuit is arranged to cause the pressure in an oil tank to be raised in the event of a leak in an oil/fuel heat exchanger mounted on the lubrication circuit.

According to document WO 2008/091341, a lubricant level is maintained as well as possible inside a casing of a rotorcraft transmission box in the event of severe damage to the casing leading to a significant loss of lubricant. The lubrication circuit is used to generate suction inside the casing on the basis of detecting a quantity of lubricant contained inside the casing that is significantly less than a usual quantity of lubricant in an ordinary mode of operation of the gearbox.

In the event of the casing being damaged, e.g. as a result of the casing being subjected to a perforating impact, the vent in the casing is closed in order to generate suction inside the casing. The suction is generated as from the beginning of lubricant escaping from the casing in order to retain as well as possible the quantity of lubricant that remains inside the casing until the rotorcraft can make an emergency landing.

According to document U.S. Pat. No. 6,470,666, it is sought to avoid lubricant escaping from a chamber housed inside the casing. The chamber has a vent and it is fed with lubricant from a lubrication circuit.

In a nominal mode of operation of the turbine, the inside volume of the casing is placed under pressure so that said pressure constitutes an obstacle to lubricant escaping from the chamber. Nevertheless, in the event of a change in the speed of the turbine, said pressure is caused to drop and the obstacle is weakened. The chamber is then subjected to negative pressure in order to avoid lubricant escaping from the inside volume of the casing. Such negative pressure or suction is applied by a depressurizing circuit in airflow communication with a vent forming part of the chamber.

From all that is set out above, it can be seen that there is an overall need, firstly while on the ground, to monitor the sealing of the casing, and secondly while the transmission box is in operation, to retain lubricant inside the casing.

The present invention gives priority to monitoring the sealing of a gearbox or an analogous box of a rotorcraft that houses lubricated moving members, and in secondary but desirable manner the invention also applies to retaining lubricant inside the transmission box while it is in use in flight.

The present invention seeks more particularly to provide a device for monitoring the sealing of a transmission box or the like that is suitable for being used on the ground prior to it being put into service and/or in the context of planned maintenance operations on the transmission box, while taking account of the constraints and objects set out above.

Such a monitoring device is also desired that can be used for retaining lubricant as well as possible inside the transmission box while waiting for its sealing to be verified in the context of planned maintenance operations for the transmission box.

It is also desirable for the monitoring device to be of a structure that is simple and easy to fit, without major structural modification, to a transmission box of any arrangement and fitted with any means for installing it on board a rotorcraft and/or associated with any provisions for ensuring its lubrication.

The device of the present invention is a device for monitoring the sealing state of a casing housing lubricated moving members and forming part of a transmission box of a rotorcraft. The casing is in particular a closed casing of inside volume that is normally confined, with the exception of the inside volume being put into communication with outside air via an airflow circuit.

According to the present invention, the device is recognizable mainly in that it includes an airflow circuit that is open to the atmosphere at its downstream end. At its upstream end, the airflow circuit has leaktight coupling means for coupling in leaktight manner with a vent of the casing, and it is fitted with a suction generator member for generating suction inside the airflow circuit. Operation of the suction generator member is under the control of control means. The device also has regulator means for regulating said suction that is maintained stable inside the airflow circuit relative to a setpoint threshold. The regulator means operate at least under the dependency of a pressure gauge for measuring the suction generated inside the airflow circuit.

When the airflow circuit is coupled to the vent, the casing is in airflow communication with the airflow circuit. Such airflow communication enables the casing to participate structurally in the airflow circuit. The concepts of upstream and downstream should be considered relative to the flow direction of fluid through the airflow circuit, from said coupling means towards the outside of the airflow circuit that is open to the atmosphere.

The leaktight coupling means are conventional means for providing a leaktight junction between two members that are to be coupled together in airflow manner. Such coupling means make use in particular of two co-operating junction members arranged respectively at the outlet of the vent in the casing and at the upstream end of the airflow circuit.

The suction generator member is preferably formed by a vacuum pump or an analogous member and it is powered electrically from a low voltage electrical power supply. Operating the suction generator member from the low voltage electrical power supply allows it to be driven on the ground from a store of electrical energy and in flight from the electricity network on board the aircraft.

The regulator means are included in particular in the control means and they generate regulation orders for operating the suction generator member as a function at least of the suction value measured in the airflow circuit by means of the pressure gauge. On the basis of regulation orders, which are generated in response to data delivered at least by the pressure gauge, the regulator means maintain stable suction inside the casing relative to the setpoint threshold. The setpoint threshold may be a predefined setpoint threshold or it may be a setpoint threshold that is calculated by calculation means included in the regulator means, as described below.

Inside the casing, suction is maintained stable relative to the setpoint threshold by the regulator means. In the absence of any leak, the suction obtained inside the casing at the setpoint threshold is naturally maintained without the suction generator member being activated significantly. Sustained activation of the suction generator member for the purpose of maintaining suction in the casing at the setpoint threshold reveals that there is a source of lubricant leakage. The magnitude of this lubricant leakage may be evaluated at least as a function of the frequency with which the suction generator member is actuated, and possibly also as a function of the electrical energy that is consumed by the suction generator member. Since the suction generator member is preferably driven by electricity, the electrical energy that it consumes can easily be determined by appropriate conventional means.

The location of the leakage source can easily be determined by an operator, from the suction inside the casing that clearly generates an intake of outside air into the inside of the casing through the leakage source. Such arrangements are advantageous for enabling an operator to respond quickly and easily to a visual observation to isolate any leakage source in a dirty environment of the kind in which transmission boxes are to be found.

A pressure gauge probe is preferably placed on the airflow circuit as close as possible to the casing, and in particular in its inside volume, providing the casing vent is coupled to the airflow circuit.

In an advantageous embodiment, the device includes information generator means for generating information at least about the operation of the suction generator member by the regulator means. The information generator means are in communication in particular with the regulator means from which data is potentially available concerning at least the operation of the suction generator member.

The way in which the suction generator member is operated can reveal instability in the suction generated in the airflow circuit, and more particularly in the casing connected to the airflow circuit. Said information enables an operator on the ground to identify the presence of a source, if any, of lubricant leaking out from the casing.

Information may be collected on the ground prior to the transmission box being put into service, and/or advantageously in flight after the device has been installed on board a rotorcraft and while the transmission box is operating in flight. On the basis of the history of at least the operation of the suction generator member, suitable for revealing the presence, if any, of a leak of lubricant from the casing, and also its magnitude, ground personnel are in a position to evaluate the sealing state of the transmission box and whether or not it is appropriate to perform repair and/or maintenance operations, if any.

Preferably, the information generator means comprise time-measuring means associated at least with detector means for detecting both activation of the suction generator member and conversely stopping thereof, which time-measuring means are possibly also associated with evaluator means for evaluating the electrical energy consumed by the suction generator member.

The information relates at least to monitoring the frequency of the on/off operation of the suction generator member. It is preferable to refine this information by monitoring the electrical energy that the suction generator member consumes, in order to evaluate the force it delivers for maintaining the suction in the airflow circuit stable at the setpoint threshold.

Advantageously, the information generator means are associated at least with memory means for storing the information that is generated, and possibly also with transcription means for transcribing that information.

By way of example, said transcription means may be of the type that operate by means of a display, by printing a document, and/or by any other analogous transcription technique making use of transcription means forming part of the device. The transcription means enable ground personnel to consult a data history relating at least to the operation of the suction generator member on the basis of said information as generated and as collected. Analysis performed by an operator on the data history enables the operator to assess the magnitude of any leak of lubricant out from the casing.

In particular, the control means include a switch for manually controlling the selective supply of electrical power to the suction generator member. Said switch enables the operator to disconnect the electrical power supply of the suction generator member during maintenance and/or repair operations on the transmission box, and in particular when it is necessary to open the casing so as to connect it to the open air.

In a preferred embodiment, the regulator means comprise calculation means for calculating the setpoint threshold relative to a predetermined setpoint pressure difference between the suction generated inside the airflow circuit and atmospheric pressure as measured by a pressure sensor placed outside the airflow circuit.

Such a setpoint pressure difference is assessed in particular relative to a reference suction level that it is desired to maintain in the airflow circuit, as considered at average atmospheric pressure on the ground.

In a situation in which the rotorcraft is in flight, atmospheric pressure varies with altitude. It is desirable to keep stable the pressure difference between the atmospheric pressure surrounding the airflow circuit, and in particular the casing, and also the suction generated inside the airflow circuit. The setpoint threshold under such circumstances is defined relative to said predetermined setpoint pressure difference.

Preferably, the regulator means also include a valve arranged on an inlet for outside air placed as a branch circuit between the ends of the airflow circuit. The valve is operable by an actuator that is operated under control of the calculation means.

Since a variation in the altitude of the rotorcraft can lead to a change in the setpoint threshold as a function of the measured surrounding atmospheric pressure, it is possible for a drop in atmospheric pressure to lead to a considerable amount of suction inside the casing while operating on the basis of a setpoint threshold previously calculated on the basis of a rise in atmospheric pressure. Such a considerable amount of suction can risk damaging fragile members of the transmission box, and in particular sealing members. In order to avoid such a risk, the airflow circuit is connected to the air by opening the valve, until reaching a level of suction inside the casing that complies with the setpoint pressure difference.

Preferably, the information generator means generate additional information relating at least to the measured atmospheric pressure, and possibly also to the operation of the valve by the actuator. The additional information comes in particular from data delivered by the regulator means.

The device may also include alarm means under the control of the information generator means. Such alarm means may for example generate an alarm message that is communicated to the pilot of the rotorcraft by means of an alarm member suitable for being installed on the instrument panel of a rotorcraft. Such alarm means may also be used by an operator on the ground in order to alert the operator to a possible maintenance operation that needs to be performed on the transmission box. Such alarm means may generate two distinct alarm signals suitable for use respectively by the pilot of the rotorcraft and by a maintenance operator on the ground.

Prolonged activation of the suction generator member relative to a predetermined operating threshold reveals a significant source of leakage of lubricant from the casing. When such a leakage source is evaluated relative to the operating threshold as being significant and requiring a maintenance operation on the transmission box, a first alarm signal that is useful for an operator on the ground is issued. When such a source of leakage is evaluated relative to the operating threshold as being so significant as to endanger the safety of the aircraft, then a second alarm signal is issued to warn the pilot of the rotorcraft.

The device includes at least one bowl at the downstream end of the airflow circuit for recovering lubricant potentially conveyed along the airflow circuit, and possibly also a particle filter placed upstream from the bowl. Such arrangements seek to avoid polluting the surroundings of the transmission box.

During a stage of the transmission box operating in flight, the device is a device for retaining lubricant inside the casing by preventing it from escaping through a leakage source. The ability of the control device to maintain stable suction inside the casing is used, where necessary, to retain lubricant inside the casing by preventing it from escaping through the source of leakage. The quantity of lubricant contained inside the casing is maintained substantially constant by the suction in the airflow circuit. Nevertheless, the leakage source may be revealed from information generated about the use of the suction generator member in flight.

The present invention also provides a rotorcraft transmission box of the gearbox type for providing mechanical transmission of motion between at least two members. Such a transmission box is recognizable according to the invention mainly in that it is fitted with a device for monitoring the sealing state of a casing of the transmission box, as described above.

The present invention also provides a rotorcraft transmission box of the bearing box type for mounting at least one rotary shaft. Such a transmission box is recognizable according to the invention mainly in that it is fitted with a device for monitoring the sealing state of a casing of the transmission box, as described above.

The independence of the structure of the monitoring device enables it to be coupled to any transmission box, such as a gearbox, a bearing box for mounting rotary shafts, or any other analogous box housing lubricated moving members. Such independence should be assessed in particular with respect to it being possible to separate the structure of the device from any particular arrangement that might exist relating to the structural organization and to the methods of installing or operating the transmission box, in particular concerning the way in which its lubrication and/or its installation are organized.

The present invention also provides a method of implementing a device for monitoring the sealing state of a casing of a transmission box, as described above.

According to the present invention, such a method is recognizable mainly in that prior to putting a transmission box into service, the method comprises the following operations:
   connecting the airflow circuit to the casing via the vent with which the casing is provided;
   generating suction inside the casing by operating the suction generator member under the control of the regulator means, and using the regulator means to maintain the suction inside the casing relative to said setpoint threshold;
   an operator monitoring the operation of the suction generator means by the regulator means, at least concerning the frequency with which it is put into operation compared with a setpoint frequency based on there being no significant passage for outside air through the casing via a lubricant leakage source; and
   in the event of a said leakage source being detected on the basis of said monitoring operation, the operator visually observing the casing while suction is maintained therein and identifying the location of at least one cause of leakage.

The monitoring operation may advantageously be an operation of consulting data delivered by the information generator means.

According to one approach of the present invention, the method comprises more particularly the following operations:
   A) during a stage in which a said transmission box is in operation, the device being installed on board a rotorcraft and being connected to the casing:
      generating suction inside the casing by operating the suction generator member under the control of the regulator means until reaching said setpoint threshold, and using the regulator means to maintain the suction inside the casing stable relative to said setpoint threshold; and
      collecting and storing a history of the data generated by the information generator means; then
   B) during a stage of maintaining the rotorcraft on the ground:
      playing back the history in transcribed form in order to enable an operator to detect a potential source of leakage by observing the data history; and then
      in the event of a said leakage source being detected:
         generating suction inside the casing by operating the suction generator member under the control of the regulator means and using the regulator means to maintain the suction inside the casing stable relative to said setpoint threshold; and
         an operator visually observing the casing while suction is being maintained therein and identifying the location of at least one cause of leakage.

In a particular way of using the device of the present invention, the method comprises the following additional operations during a stage of the transmission box operating on board the rotorcraft:
   measuring atmospheric pressure by means of the sensor and measuring the suction maintained inside the casing by means of the pressure gauge;
   the calculation means evaluating the current pressure difference between the measured atmospheric pressure and the suction inside the casing, and comparing the current pressure difference with the setpoint pressure difference; and
   the calculation means determining the setpoint threshold to be maintained in order to maintain the setpoint pressure difference.

Preferably, the method also includes the following specific additional operations:
- on the basis of said comparison operation, the calculation means discovering a current pressure difference value that is greater than the setpoint pressure difference value; and
- activating the actuator to open the valve so as to cause outside air to enter into the inside of the airflow circuit until reaching the setpoint pressure difference value inside the airflow circuit.

BRIEF DESCRIPTION OF THE SEVERAL VIEWS OF THE DRAWINGS

The present invention is described with reference to the sole FIGURE of the accompanying sheet, which shows a preferred embodiment of a device of the present invention.

DETAILED DESCRIPTION OF THE INVENTION

In the sole FIGURE, a rotorcraft transmission box 1 comprises a casing 2 that houses moving members 3 and that is in fluid flow communication with a closed circuit 4 for lubricating said moving members 3. Such a transmission box 1 may equally be of the gearbox type for mechanically transmitting motion between at least two members, or of the bearing box type for mounting moving members, such as at least on rotary shaft. In general, the transmission box 1 has a casing 2 that confines the moving members 3, said casing 2 being fitted with a said closed lubrication circuit 4. The structure and the organization of the closed lubrication circuit 4 are not relevant to the proposals of the present invention. Indeed, the device purposed by the present invention to monitoring the sealing state of the casing 2 is advantageously structurally distinctive from the closed lubrication circuit 4.

The transmission box 1 has a device for monitoring its sealing. The device is arranged to operate in self-contained manner, independently of any other equipment of the transmission box 1, while performing various functions relating to monitoring the sealing of the transmission box 1. Such device for monitoring is advantageously structurally distinctive from the closed lubrication circuit 4.

On the ground, the device serves in particular to verify the sealing state of the transmission box 1 before it is put into operation on board a rotorcraft or during a maintenance operation on the rotorcraft. In flight, the device is used in particular for retaining lubricant inside the casing 2 in the event of there being a source of leakage, and to collect information about the operation of the device. Such information may advantageously be used on the ground during a maintenance operation on the rotorcraft, or in order to assess the flying conditions of the rotorcraft.

The casing 2 has a vent 5 that is in airflow communication with the upstream end 6 of an airflow circuit 7 that is open at its downstream end 8. The casing 2 and the airflow circuit 7 include leaktight coupling means 9 that co-operate with each other. Said coupling means 9 are preferably of the type having an easily reversible junction, e.g. by engaging co-operation between two co-operating screw fastener members, or any other analogous easily reversible junction means.

Said easily reversible junction enables an operator easily to establish airflow communication between the casing 2 and a said airflow circuit 7, or conversely easily to interrupt said airflow communication. Such arrangements make it possible, as necessary, for an operator either to use a said airflow circuit 7 for maintenance on the ground in order to detect a possible leak from the transmission box, or to use a said airflow circuit 7 on board the rotorcraft in order to monitor the sealing of the transmission box 1, or indeed to act on the pressure of the air flowing through the airflow circuit 7.

It should be understood that the maintenance airflow circuit 7 and the on-board airflow circuit 7 are analogous structures, at least concerning a general approach of the present invention.

The airflow circuit 7 has a suction generator member 10 such as a vacuum pump or the like. Suction is generated inside the airflow circuit 7 with the effect of establishing suction in the inside volume of the casing 2 that is coupled to the airflow circuit 7. Operation of the suction generator member 10 is under the control of control means 11.

The control means 11 comprise regulator means 12 for regulating said suction, with the operation thereof being monitored by a pressure gauge 13. Said pressure gauge 13 is used for measuring the suction generated inside the airflow circuit 7, and preferably inside the casing 2 coupled to the airflow circuit 7. The suction is maintained at a stable value inside the casing 2 with reference to a setpoint threshold S for activating the regulator means 12. Such a setpoint threshold S is defined in particular relative to a reference suction D that it is desired to maintain inside the casing 2. The reference suction D is predefined and adapted relative to a compromise between: preventing any oil escaping through a potential source of leakage in the transmission box 1, for a leakage source that is deemed to be acceptable; and preserving fragile members of the transmission box 1, and in particular sealing members.

On the ground, the sealing of the transmission box 1 may be monitored prior to it being installed on the rotorcraft, in particular in the context of an operation for verifying its sealing before it is put into service. Suction is generated inside the casing 2 via the airflow circuit 7, with said suction being maintained at a setpoint threshold corresponding to the reference suction D. Where applicable, the suction generated inside the casing 2 induces a flow of air through a leakage source, if any, in the transmission box 1. If an operator observes that the suction generator member 10 is delivering an effort to maintain suction inside the casing 2 that is stable relative to the reference suction D, then that may reveal the presence of any such source of leakage, and its magnitude. Said observation may be made by the operator using the operator's own natural senses.

In the preferred embodiment that is shown, the control means 11 are in communication with information generator means 14 for generating information about the operation of the suction generator member 10 by the control means 11, and more particularly by the regulator means 12. On the ground, the operator may make use of the current information delivered by the information generator means 14 in order to observe the operation of the suction generator member 10 for the purpose of detecting a leakage source, if any, in the transmission box 1.

Said information generator means 14 associate in particular time-measuring means 15 and detector means 16 for detecting activation of the operation of the suction generator member 10, or conversely stopping thereof. The information generator means 14 are also capable, independently of or in combination with the above-described association, of associating said time-measuring means 15 with means 17 for evaluating the electrical energy consumed by the suction generator member 10.

Preferably, the information generator means 14 are also associated with memory means 18 for storing the information they generate, likewise possibly in isolation or else in combination with the above-described association, together with transcription means 19 for transcribing the information generated.

In a preferred embodiment, the transcription means 19 are removable means, since they are not designed to be installed permanently on board the rotorcraft. It is preferable to make use of such transcription means 19 on the ground as a result of acting on the ground to put them temporarily into communication with the memory means 18 in order to copy the information that has previously been stored in flight.

The control means 11 include a switch 20 that is manually operable by the operator on the ground selectively to activate or conversely to interrupt communication between an electrical power supply 21 and the suction generator member 10. Said electrical power supply 21 may be in the form of an independent source on the ground of electricity, or it may be the network on board the rotorcraft in the context of an on-board airflow circuit 7. Such a switch 20 is used in particular during maintenance operations on the transmission box 1, which operations may require the casing 2 to be connected to the open air. Such a switch 20 is also of use when an airflow circuit 7 is coupled temporarily on the ground to the casing 2.

In a particular embodiment of the airflow circuit 7, in particular an embodiment corresponding to an on-board airflow circuit 7, the regulator means 12 include calculator means 22 for calculating said setpoint threshold S relative to a setpoint pressure difference DP that is to be maintained in the airflow circuit 7 between atmospheric pressure and the current suction in the airflow circuit 7. Such a setpoint pressure difference DP is potentially induced because of variations in altitude as the flight of the rotorcraft progresses. The setpoint threshold S is corrected depending on requirements by the calculation means 22 in order to maintain said setpoint pressure difference DP.

For this purpose, the calculation means 22 are in communication firstly with said pressure gauge 13 and with an atmospheric pressure sensor 23 located outside the airflow circuit 7, and also with memory means 24 for storing information about the reference suction D and/or about said setpoint pressure difference DP that is to be maintained inside the airflow circuit 7.

Nevertheless, a first correction of the setpoint threshold S at a given altitude makes such a setpoint threshold S unsuitable for some other altitude. The suction that is potentially generated via the airflow circuit 7 is capable of reaching a value greater than said setpoint pressure difference DP, which is not desirable. Under such circumstances, a second correction of the setpoint threshold S is generated in order to adapt the suction via the airflow circuit 7 accordingly, but has no effect of its own other than allowing air to be admitted into the airflow circuit 7 in order to reduce the current suction.

For this purpose, the airflow circuit 7 is fitted with a valve 25 arranged on the inlet 26 for outside air arranged as a branch connection on the airflow circuit 7 between its upstream and downstream ends 6 and 8. The valve 25 can be operated by an actuator 27 under the control of the control means 11, and more specifically under the control of the calculation means 22.

The information generator means 14 are advantageously means for generating additional information, in particular information about the measured atmospheric pressure, about the operation of the valve 25 by the actuator 27, and about the various calculation operations generated by the calculation means 22.

The device is potentially fitted with alarm means 28, with the use thereof being under the control of the information generator means 12. Such alarm means 28 may be actuated under the effect of sustained operation of the suction generator member 10 that is indicative of a potentially large source of leakage in the transmission box 1. The alarm means 28 may be used on the ground during a maintenance operation in order to give an operator information about a repair operation that might need to be performed on the transmission box 1 or that might need to be planned. The alarm means 28 may also be used by the pilot of the rotorcraft above some alarm threshold that is considered as potentially endangering safe flight of the rotorcraft.

A subsidiary advantage procured by the device of the present invention lies in making use of said stored information in order to establish a flight history of the rotorcraft. The stability maintained in flight by the means for regulating the suction generated by a said airflow circuit makes it possible, on the basis of said flight history, to identify various atmospheric conditions through which the rotorcraft has passed in succession. Such a history can be used on its own, and it can also be used in combination with other flight histories concerning the operation of various other respective members of the rotorcraft. By using such flight histories in combination, information can be deduced about technical improvements to be made to the rotorcraft, and about defining the nature and the frequency of maintenance operations to be performed on the rotorcraft.

At its downstream end 8, the airflow circuit 7 is preferably provided with a particle filter 29 placed upstream from a bowl 30 for recovering lubricant that might be conveyed along the airflow circuit 7. Such a bowl 30 serves to avoid dirtying the environment of the transmission box 1 with a marginal escape of lubricant from the casing 2 via the airflow circuit 7.

What is claimed is:

1. A device for monitoring the sealing state of a casing housing lubricated moving members of a transmission box of a rotorcraft, the device comprising:
    an airflow circuit open to the atmosphere at its downstream end, the airflow circuit having leaktight coupling means at its upstream end for coupling in a leaktight manner to a vent of the casing, and being fitted with a suction generator member for generating suction inside the airflow circuit, operation of the suction generator member being under the control of control means;
    regulator means for regulating the suction that is maintained stable inside the airflow circuit relative to a setpoint threshold (S), operation of the regulator means being controlled at least to depend on a pressure gauge for measuring the suction generated inside the airflow circuit; and
    information generator means for generating information at least about the operation of the suction generator member by the regulator means.

2. The device according to claim 1, wherein the information generator means include time-measuring means associated at least with detector means for detecting both activation of the suction generator member and conversely stopping thereof.

3. The device according to claim 1, wherein the information generator means are associated at least with memory means for storing the information that is generated.

4. The device according to claim 1, wherein the control means includes a switch for manually controlling the selective supply of electrical power to the suction generator member.

5. The device according to claim 1, wherein the regulator means include calculation means for calculating the setpoint threshold (S) relative to a predetermined setpoint pressure difference (DP) between the suction generated inside the airflow circuit and atmospheric pressure as measured by a pressure sensor placed outside the airflow circuit.

6. The device according to claim 5, wherein the regulator means include a valve arranged on an inlet for outside air placed as a branch circuit between the upstream and downstream ends of the airflow circuit, the valve being operable by an actuator that is operated under control of the calculation means.

7. The device according to claim 6, wherein the information generator means generate additional information relating at least to the measured atmospheric pressure.

8. The device according to claim 5, wherein during a stage of the transmission box operating in flight, the device is a device for retaining lubricant inside the casing by preventing the lubricant from escaping through a leakage source.

9. The device according to claim 1, further comprising alarm means under the control of the information generator means.

10. The device according to claim 1, further comprising at least one bowl at the downstream end of the airflow circuit for recovering lubricant potentially conveyed along the airflow circuit.

11. The device according to claim 1, wherein the information generator means include time-measuring means associated at least with detector means for detecting both activation of the suction generator member and conversely stopping thereof, which time-measuring means are associated with evaluator means for evaluating the electrical energy consumed by the suction generator member.

12. The device according to claim 1, wherein the information generator means are associated at least with memory means for storing the information that is generated and transcription means for transcribing that information.

13. A rotorcraft transmission box of the gearbox type for providing mechanical transmission of motion between at least two members, the box being fitted with a device according to claim 1.

14. A rotorcraft transmission box of the bearing box type for mounting at least one rotary shaft, the box being fitted with a device according to claim 1.

15. A method for monitoring the sealing state of a casing housing lubricated moving members of a transmission box of a rotorcraft, the method comprising:
providing an airflow circuit having a downstream end open to the atmosphere and an upstream end having leaktight coupling means for coupling in a leaktight manner to a vent of the casing, the airflow circuit being fitted with a suction generator member for generating suction inside the airflow circuit;
connecting the upstream end of the airflow circuit to the vent of the casing;
generating suction inside the casing by operating the suction generator member under the control of regulator means, and using the regulator means to maintain the suction inside the casing relative to a setpoint threshold (S), operation of the regulator means being controlled at least to depend on a pressure gauge for measuring the suction generated inside the casing;
monitoring the operation of the suction generator member by the regulator means, at least concerning a frequency with which the suction generator member is put into operation compared with a setpoint frequency with which the suction generator member would be put into operation based on there being no significant passage for outside air through the casing via a lubricant leakage source;
in the event of a leakage source being detected on the basis of the monitoring operation, visually observing the casing while suction is maintained therein and identifying the location of at least one cause of leakage; and
using information generator means to generate information at least about the operation of the suction generator member by the regulator means.

16. A method of using a device for monitoring the sealing state of a casing housing lubricated moving members of a transmission box of a rotorcraft, wherein the device includes (i) an airflow circuit open to the atmosphere at its downstream end, the airflow circuit having leaktight coupling means at its upstream end for coupling in a leaktight manner to a vent of the casing, and being fitted with a suction generator member for generating suction inside the airflow circuit, operation of the suction generator member being under the control of control means, (ii) regulator means for regulating the suction that is maintained stable inside the airflow circuit relative to a setpoint threshold (S), operation of the regulator means being controlled at least to depend on a pressure gauge for measuring the suction generated inside the airflow circuit, and (iii) information generator means for generating information at least about the operation of the suction generator member by the regulator means, the method comprising:
A) during a stage in which the transmission box is in operation, the device being installed on board the rotorcraft and being connected to the casing:
generating suction inside the casing by operating the suction generator member under the control of the regulator means until reaching the setpoint threshold (S), and using the regulator means to maintain the suction inside the casing stable relative to the setpoint threshold (S); and
collecting and storing a history of the data generated by the information generator means; then
B) during a stage of maintaining the rotorcraft on the ground:
playing back the history in transcribed form in order to enable an operator to detect a potential source of leakage by observing the data history; and then
in the event of a leakage source being detected:
generating suction inside the casing by operating the suction generator member under the control of the regulator means and using the regulator means to maintain the suction inside the casing stable relative to the setpoint threshold (S); and
an operator visually observing the casing while suction is being maintained therein and identifying the location of at least one cause of leakage.

17. The method according to claim 16, wherein during a stage of the transmission box operating on board the rotorcraft, the method further comprising:
measuring atmospheric pressure by means of a pressure sensor placed outside the airflow circuit and measuring the suction maintained inside the casing by means of the pressure gauge;
calculation means evaluating the current pressure difference between the measured atmospheric pressure and the suction inside the casing, and comparing the current pressure difference with a setpoint pressure difference (DP); and
the calculation means determining the setpoint threshold (S) to be maintained in order to maintain the setpoint pressure difference (DP).

18. The method according to claim 17, the method further comprising:

on the basis of the comparison operation, the calculation means discovering a current pressure difference that is greater than the setpoint pressure difference (DP); and activating the actuator to open the valve so as to cause outside air to enter into the inside of the airflow circuit until reaching the setpoint pressure difference (DP) inside the airflow circuit.

* * * * *